Figure 1:
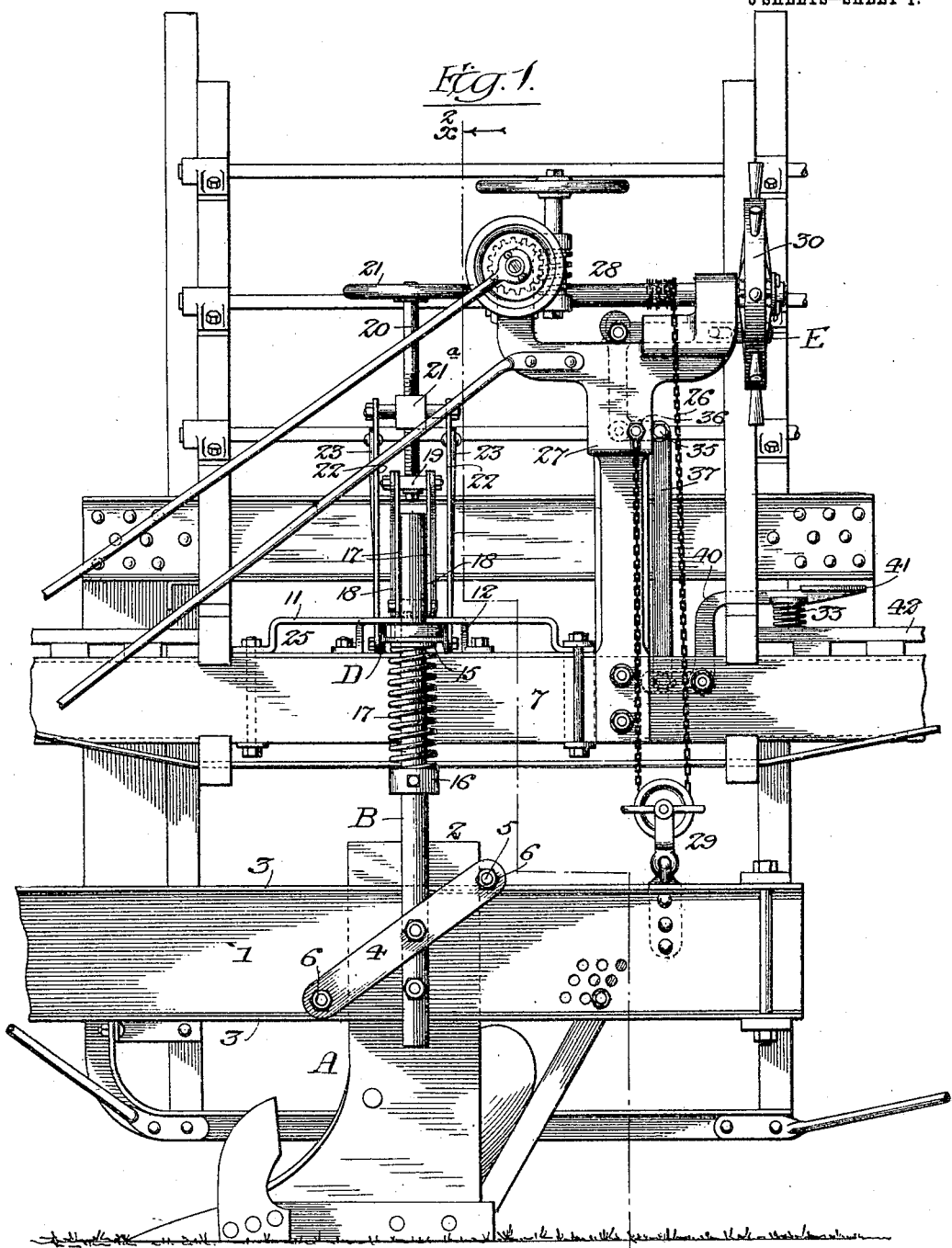

No. 784,545. PATENTED MAR. 14, 1905.
L. V. BROPHY.
GRADING AND DITCHING MACHINE.
APPLICATION FILED NOV. 25, 1904.

3 SHEETS—SHEET 1.

Witnesses:—
Louis M. F. Whitehead
O. C. Freiberg

Inventor:—
Luke Vincent Brophy
By Chas. G. Page
Atty.

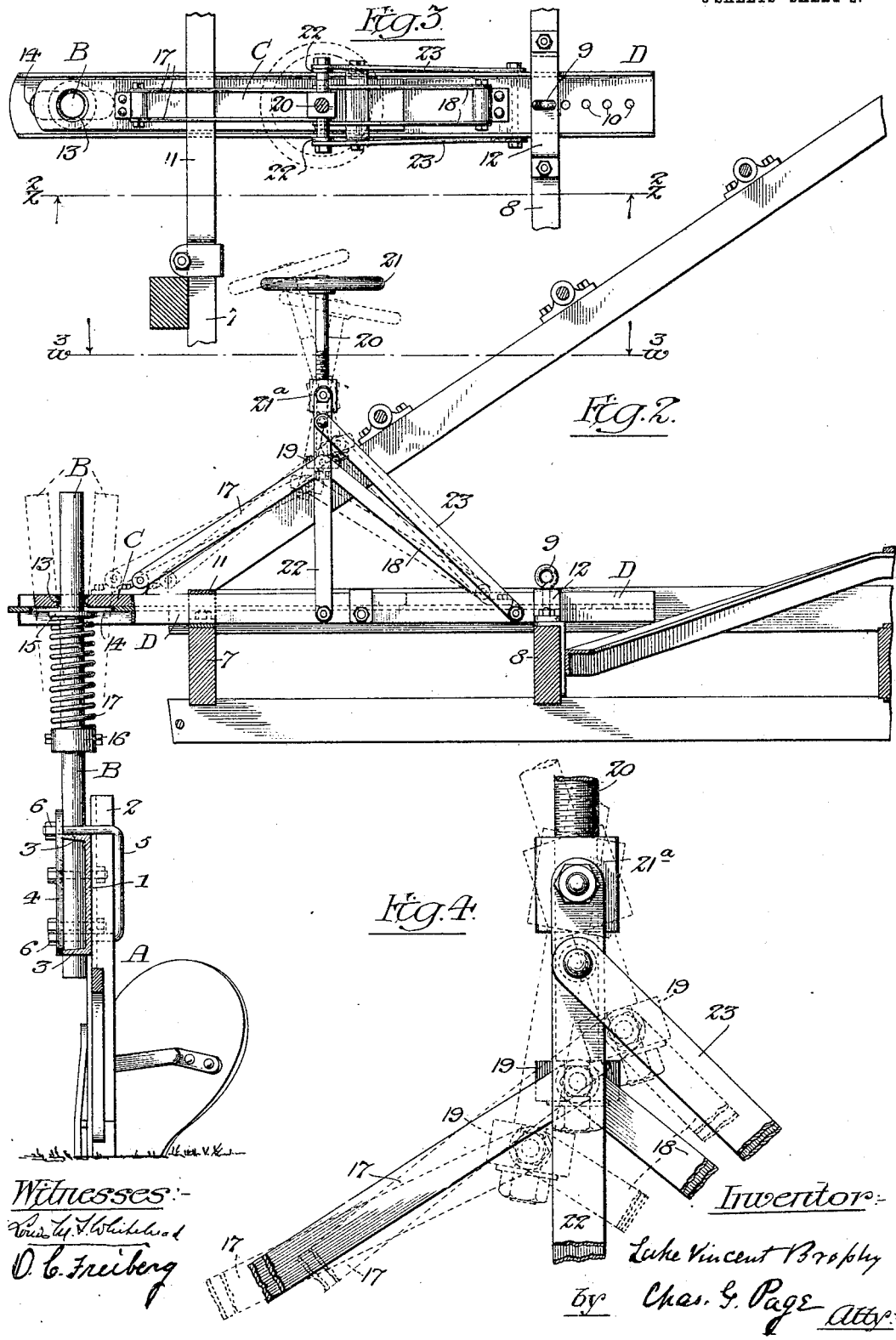

No. 784,545. PATENTED MAR. 14, 1905.
L. V. BROPHY.
GRADING AND DITCHING MACHINE.
APPLICATION FILED NOV. 25, 1904.
3 SHEETS—SHEET 3.
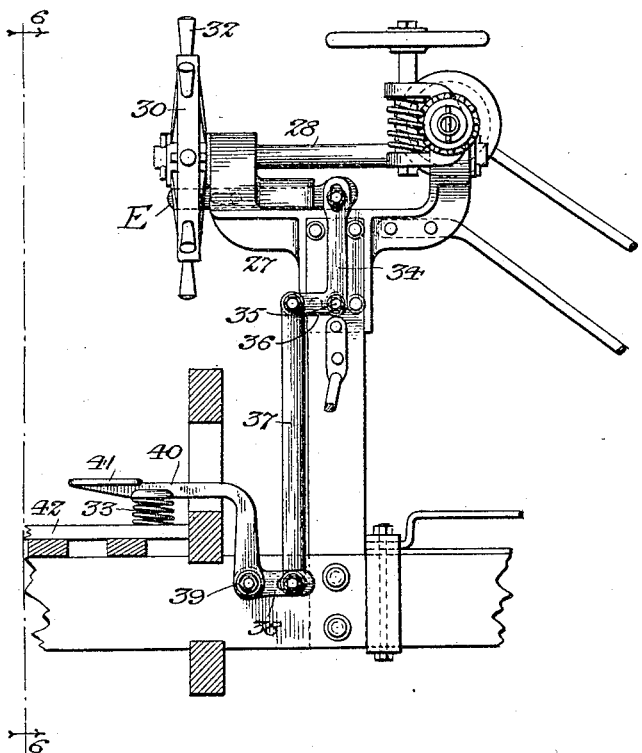
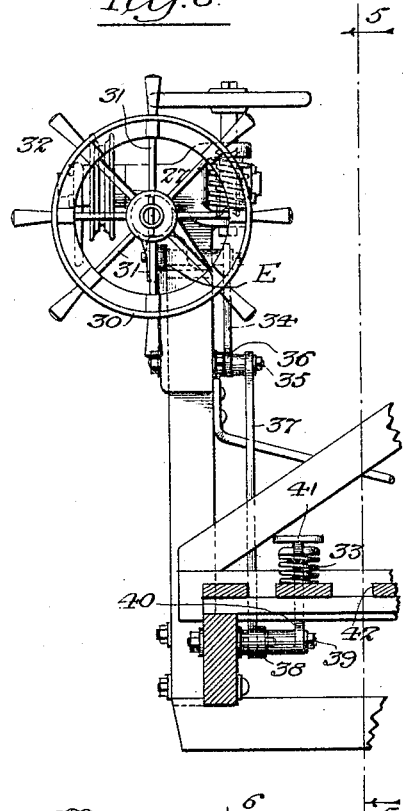
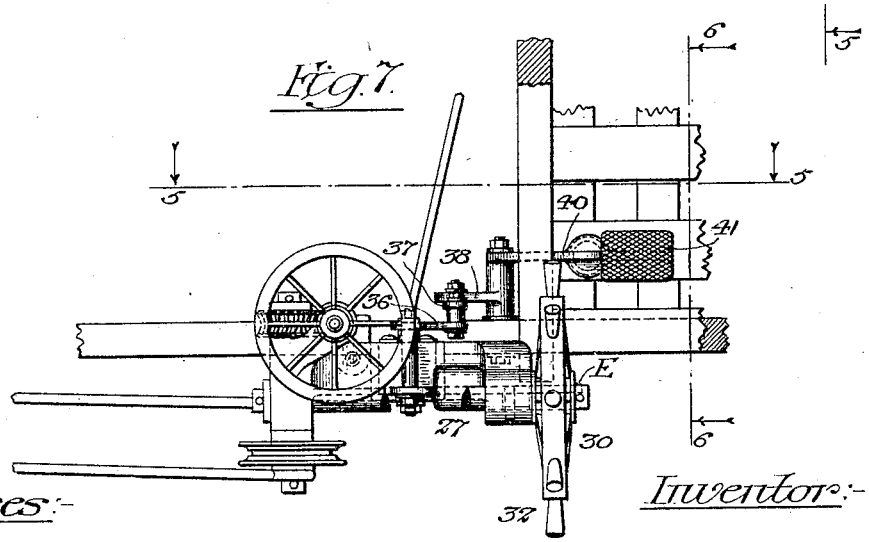
Witnesses:—
Louis M. Whitehead
O. C. Frieberg
Inventor:—
Luke Vincent Brophy
by Chas. G. Page
Atty.

No. 784,545.

Patented March 14, 1905.

UNITED STATES PATENT OFFICE.

LUKE VINCENT BROPHY, OF BARBERTON, OHIO, ASSIGNOR TO NATIONAL DRILL & MANUFACTURING COMPANY, OF CHICAGO, ILLINOIS, A CORPORATION OF WEST VIRGINIA.

GRADING AND DITCHING MACHINE.

SPECIFICATION forming part of Letters Patent No. 784,545, dated March 14, 1905.

Application filed November 25, 1904. Serial No. 234,190.

*To all whom it may concern:*

Be it known that I, LUKE VINCENT BROPHY, a citizen of the United States, residing at Barberton, in the county of Summit and State of Ohio, have invented certain new and useful Improvements in Grading and Ditching Machines, of which the following is a specification.

My invention relates to grading and ditching machines or elevating-graders of the class in which a plow is suspended at one side of the machine and arranged to deliver the plowed-up soil onto an elevating-carrier, which in turn discharges the loose soil at the opposite side of the machine. As an illustration of one of these machines to which my improvements can be applied I have selected and partially illustrated portions of a grading and ditching machine shown in patent to Thomas J. Gray, No. 743,487, dated November 10, 1903. In said patent the plow, comprising the plow-beam, the standard, and the plowshare, is suspended along one side of the machine by chains or cables, one of which I have illustrated in my present application.

Objects of my invention are to provide improved means for laterally tilting the plow, to readily tilt the plow at the will of an attendant standing upon a platform where he also has control of the plow raising and lowering devices, to permit the plow-tilting device to yield to or permit various movements on the part of the plow, to provide an exceedingly powerful plow-tilting device which can be readily operated by a single operator, to provide improved means for locking a pilot-wheel on a winding-shaft for one of the raising and lowering cables, and to provide certain novel and improved details tending to increase the general efficiency of grading and ditching machines.

Figure 1 represents in side elevation a portion of a grading and ditching machine embodying my improvements, the general arrangement of framework being similar to that shown in said patent to Gray. Fig. 2 is a sectional elevation, the plane of the section being vertical and indicated by line 2 2 in Fig. 1 and line 2 2 in Fig. 3. Fig. 3 is a sectional plan of the tilting device, the plane of the section being indicated by line 3 3 in Fig. 2. Fig. 4 is a detail of a portion of a toggle device for tilting the plow. Fig. 5 is a sectional elevation mainly illustrating means for locking and releasing the pilot-wheel, the section being on line 5 5 in Fig. 6. Fig. 6 is a sectional elevation, the plane of the section being on line 6 6 in Fig. 5. Fig. 7 is a plan view of Fig. 5. In said Fig. 7 line 6 6 corresponds with line 6 6 in Fig. 5, and line 5 5 in said Fig. 7 corresponds with line 5 5 in Fig. 6—that is to say, these two lines in Fig. 7 further assist in illustrating the sides at which the mechanism in Figs. 5 and 6 is viewed.

The plow A is understood to be supported at one side of the machine, so as to be capable of lateral tilt, as in said Patent No. 743,847, in which suspending-chains are connected with the plow-beam respectively fore and aft of the plow-standard. The plow A is provided with an upwardly-extending arm B, shown in the drawings as a bar or rod rigidly secured to the plow-beam 1 alongside the usual plow-standard 2. As a simple and secure connection between this rod and the plow-beam the lower portion of this arm B is shown extending through notches in the flanges 3 of a channel-bar forming the plow-beam 1 and bolted to the web of the channel-bar, the arm being further secured upon the plow-beam by an inclined clamp or plate 4 on one side and a staple-shaped bolt 5, arranged as a clamp for binding together the plow-standard 2, the plow-beam 1, and the plate 4, as in Fig. 2, the ends of the staple-shaped clamp-bolt being in engagement with the plate 4 and secured by tightening nuts 6, as in Figs. 1 and 2.

The arm or rod B is in the nature of a lever-arm to which power is applied for laterally tilting the plow in accordance with the character of the work and requirements which arise during operation, and hence said arm may be described as a tilting arm or member which is tilted laterally to the line of progression of the plow by the application of suitable tilting power to such tilting or tiltable member. The power for thus tilting the member B is applied to it sufficiently above the plow to obtain required leverage, and, broadly considered, this upwardly-extending tilting arm may be tilted by various mechanical devices. With reference to the construction of device shown for tilting the arm B, so as to thereby tilt the plow at will, C indicates a reciprocative member (see particularly Figs. 2 and 3) arranged to engage the arm B and supported to operate in direction transverse to the said arm. The action of this reciprocative member C serves to tilt the arm B transversely to the line of progression of the plow, the arm B being tilted toward one or the other side, according to the direction in which the member C is moved. Suitable mechanical means are provided for operating the member C, it being also within the scope of my invention to actuate the member C by any desired mechanical movement. As shown, the member C is constructed and arranged as a slide plate or bar arranged to slide in a guideway formed by the upper channel of an I bar or beam D, which is positioned transverse to the length of the plow-beam and supported upon suitable members or longitudinal sills 7 and 8, Fig. 3, of the body-frame of the machine. One end portion of the I beam or bar D is held on the longitudinal sill 8 by a removable pivot 9, and such end portion of the bar or beam D is provided with a series of holes 10 for said pivot, whereby the bar or beam can be adjusted endwise, and thereby adjusted in a direction transverse to the length of the plow. The bar D rests upon the sills 7 and 8 and is kept down thereon by cleats 11 and 12, the former being longer than the latter, so as to provide space for lateral swing on the part of the beam D. With this arrangement the cleat 12, Fig. 3, also provides a bearing for the pivot 9, which extends through such cleat and engages in one of the holes 10 in the beam or bar D. This reciprocative bar or shifting member D has at one end portion an articulated connection with the rod B. In Figs. 2 and 3 this connection is illustrated by an opening formed through bar C, having knife-edge marginal portions 13 engaging the rod B, which extends up through such opening, said rod B also extending up through a slot 14 in the bar D, so as to allow the rod B to tilt, as indicated by dotted lines in Fig. 2, when the slide or bar C is moved longitudinally.

The rod B is provided with a loose collar 15 and an adjustable collar 16 and a spring 17, arranged between the two collars. The upper loose collar is maintained against the web of the I beam or bar D by such spring, and when desired the collar 16 can be adjusted up or down on the rod B for the purpose of varying the spring tension, and hence varying the down spring-pressure on the plow.

The device shown for operating the reciprocative bar or member C comprises a toggle and suitable hand device for adjusting the same. To such end the toggle comprises a toggle-arm 17, having its lower end hinged to the slide C, and a toggle-arm 18, having its lower end hinged to a fixed support, such as to the beam D, as shown. The toggle-arms converge upwardly and are hinged at their upper ends to a head 19, which is in turn swiveled upon the lower end of a screw-rod 20. The screw-rod 20 is preferably provided with a hand-wheel 21, by which it can be readily turned either way, and in order to raise and lower the screw-rod so as to actuate the toggle said screw-rod extends through and engages a nut $21^a$, which is trunnioned upon suitable fixtures—for example, upright supports 22, strengthened by braces 23. With this arrangement the nut $21^a$ and rod 20 swing when the rod is actuated to raise or lower head 19 for the purpose of operating the toggle, the swing of said members to the right and left being indicated by dotted lines in Figs. 2 and 3. By simply turning the hand-wheel 21 the toggle can be actuated so as to operate the slide C, and thereby tilt the rod or member B, and as the latter is rigidly secured to the plow the tilt of said rod B will necessarily tilt the plow laterally to the line of progression. Also the plow can be readily tilted to different degrees, and it can be tilted for either side, as may be desired.

It will be observed that the slide C and the device for operating said slide or shift bar are all supported upon the bar or member D, which is adjustable longitudinally and also supported to swing horizontally. By adjusting the pivot 9 from one to another of pivot-holes 10 in the bar D the adjustment of said bar can be made so as to give the arm B and plow to which it is attached a normal inclination to one side or the other, as may be desired, and that this adjustment will not interfere with the free action of the operative devices for tilting the plow.

The strap or cleat 12, as best shown in Fig. 3, passes over the bar D and may be comparatively short—that is to say, it may be made considerably shorter than the strap or cleat 11, which passes over the bar D at a point forward of its pivot 9. By making the cleat 11 comparatively long, as best shown in Fig. 1, the bar D, which is arranged between cleat 11 and the longitudinal side sill 7, can swing or will have a range of swing from one end to the other of the space 25 between said sill and cleat. This permissible horizontal swing forwardly and back on the part of the bar D is to permit the tilting mechanism as a whole to move backward or forward synchronously with backward or forward movement on the part of the plow, it being seen that when the bar B swings forward or backward the arm or rod B and the slide or shifter C will also partake of such movement.

In Fig. 1, 26 indicates one of the plow-suspending chains or cables attached at one end to a bracket-bearing 27 on the main frame and having its opposite end portion arranged to wind upon and pay out from an upper winding-shaft 28, also supported upon said bracket. This cable 36 is preferably connected with the plow-beam in rear of the plow-standard 2 by passing under a pulley 29 on the plow-standard, and one end of the winding-shaft 28 is provided with an operating pilot-wheel 30, having spokes 31 and radially-projecting handles 32, as best shown in Fig. 6. The pilot-wheel 30 is normally locked by a latch-bolt E, supported upon the bracket 27 and arranged to slide horizontally and in a direction to project between any two relatively adjacent spokes of the pilot-wheel. The latch-bolt E is also subject to a spring 33, which normally holds the latch-bolt E in position to project between a couple of spokes of pilot-wheel, and thereby lock the latter. The latch-bolt E is arranged to shift horizontally and has its rear end connected with the upper arm 34 of the bell-crank 35. The lower arm 36 of this bell-crank connects by a rod or pitman 37 with the arm 38 of the bell-crank 39, having its remaining arm 40 provided with a step 41, upon which an attendant standing on platform 42 can exert foot-pressure for the purpose of operating the bell-crank in a way to cause the upper bell-crank to draw back the latch-bolt E to an extent to release it from the pilot-wheel, and upon taking his foot from the arm 40 the spring 33, which is preferably arranged under the long arm 40 of bell-crank 33, will actuate the bolt-operating device in a way to again project the bolt between the spokes of the pilot-wheel. This arrangement renders it unnecessary for the attendant to reach up to a hand-latch for the pilot-wheel and permits him to take hold of the handle 32 of the pilot-wheel with both hands preparatory to using his foot as a means for primarily operating the locking device in a way to unlock the pilot-wheel.

It is understood that in machines of this class in which the plow is suspended by chains or cables the plow is capable of various movements, such as side tilt, forward-and-back movement, and horizontal swing about a vertical axis between the face of the plow-beam. The universal joint between the reciprocative member C and the plow-beam B obviously permits the plow to have these movements. For example, the plow as a whole may swing horizontally about a vertical axis through the upright arm B. Furthermore, this universal joint will permit the arm B to accommodate itself to any irregular movements the plow may make during operation.

By locking the reciprocative member C about the plow sufficient leverage is obtained for all desired purposes, it being seen that the arrangement illustrated permits the arm B to be of considerable length. The slot 14 in the support or member D for the reciprocative member C is of sufficient length to permit all desired extent of longitudinal movement on the part of the bar which I have illustrated as forming the shifter or reciprocative member C.

While I regard the toggle device shown as highly efficient, I do not strictly confine myself to a toggle device, as other forms of mechanical devices for converting the rotary motion of a hand-wheel into a horizontal reciprocative movement may be employed, the direction of such horizontal reciprocative movement being of course dependent upon the direction in which the hand-wheel is revolved.

It will also be seen that the arm B while having a universally-jointed connection with the reciprocative member C also has a sliding connection therewith, so as to permit the plow to be raised or lowered independently of the reciprocative member C.

It will be observed that in the said Gray patent a reciprocative member is arranged upon a rear stay-bar, which is pivoted to the plow-beam by a pivot or pintle, as best shown in Fig. 8 of said patent. In the device herein illustrated the arm or rod B is capable of axial movement when the plow is caused during operation to swing or turn horizontally about the axis of the rod B, and at the same time said rod B forms an arm to which the reciprocative member C can be directly applied at a point sufficient above the plow to secure all desired leverage. Moreover, the position of the plow can be varied by swinging the bar or member C horizontally, and by reason of the universal joint between members B and C the suspended plow can have all of the various movements of which a plow suspended by chains or cables is capable.

What I claim as my invention is—

1. In a grading and ditching machine, a plow supported for side tilt; an arm rigidly connected with and extending upwardly from the plow and arranged to tilt in unison with the side tilt of the plow; and a reciprocative member for tilting said arm in directions to cause side tilt on the part of the plow; said arm and reciprocative member being connected by a swivel connection permitting the arm to turn axially and independently of the reciprocative member.

2. In a grading and ditching machine, a plow supported for side tilt; an arm rigidly connected with and extending upwardly from the plow and arranged to tilt in unison with the side tilt of the plow; and a reciprocative member for tilting said arm in directions to cause side tilt on the part of the plow; said arm and reciprocative member being connected by a swivel connection forming a universal joint.

3. In a grading and ditching machine, a plow supported for side tilt; an arm connected with and extending upwardly from and arranged to tilt in unison with the side tilt of the plow; and a reciprocative member for tilting said arm in directions to cause side tilt on the part of the plow; the arm and the reciprocative member being connected by a universal swivel-joint; and a device for actuating the reciprocative member in direction to cause it to tilt the arm.

4. In a grading and ditching machine, a plow supported for side tilt; an arm consisting of a rod or bar rigidly secured to the plow and extending upwardly therefrom and arranged to tilt in unison with the side tilt of the plow; a reciprocative member for tilting said arm in directions to cause side tilt on the part of the plow; a toggle device for operating the reciprocative member; and a screw-rod engaging a nut supported as a fixture, said screw-rod being connected with the toggle as a means for operating the same.

5. In a grading and ditching machine, a plow supported for side tilt; an arm attached to and extending upwardly from the plow and arranged to tilt in unison with the side tilt of the plow; a reciprocative member for tilting said arm in direction to cause side tilt on the part of the plow, said arm and reciprocative member being connected by universal swivel connection; and a laterally-swinging member upon which the reciprocative member is supported.

6. In a grading and ditching machine, a plow supported for side tilt; an arm attached to the plow and extending upwardly therefrom and arranged to tilt in unison with the side tilt of the plow; a reciprocative member for tilting said arm in directions to cause side tilt on the part of the plow, said arm and reciprocative member being connected by a universal joint; and a laterally-swinging member consisting of a bar supporting the said reciprocative member, the said member being arranged transverse to the line of progression and being supported for longitudinal adjustment.

7. In a grading and ditching machine, a plow supported for side tilt and having an upwardly-projecting rod or arm; a reciprocative member having a universal-jointed connection with the upwardly-extending arm; a support upon which the reciprocative member is arranged to slide; a toggle having one arm connected with the reciprocative member and having its other end connected with the support for the reciprocative member; and suitable means for operating the toggle.

8. In a grading and ditching machine, a plow supported for side tilt; an arm consisting of an upright rod rigidly secured at its lower end to the plow; a reciprocative member for tilting said rod consisting of a slide having an opening through which the upper end portion of the rod extends, the edge around said opening being wedge-shaped to engage the rod and thereby form a universal swivel-joint; and mechanism for adjusting the slide in directions to tilt the arm on the plow.

9. In a grading and ditching machine, a plow supported for side tilt; a rod or bar forming an arm which is secured to the plow and arranged to extend upwardly therefrom; a reciprocative member arranged laterally to the axis of the said rod and connected therewith by a universal joint; and a spring arranged about a portion of said rod and confined between the reciprocative member and an adjustable stop or shoulder arranged at a point lower down upon the rod or arm.

10. In a grading and ditching machine, a plow suspended by chains or cables; an arm attached to the plow and extending upwardly therefrom; a horizontally-swinging bar having its free end portion provided with a longitudinal slot through which said upright plow-arm extends; a reciprocative bar supported upon and guided by said bar and having a swivel connection with the upright arm of the plow, said swivel connection being also in the nature of a universal joint, whereby the arm on the plow can partake of different movements on the part of the latter.

11. In a grading and ditching machine, a plow-beam suspended by chains or cables; a reciprocative member supported for movement in directions transverse to the line of progression of the plow; an upright arm connecting the plow with said reciprocative member; and a universal-jointed connection permitting various movements on the part of the plow independent of the reciprocative member.

12. In a grading and ditching machine, a plow suspended by chains or cables; an arm attached to the plow and extending upwardly therefrom; a transversely-arranged I-beam pivoted at one end upon the body-frame of the machine and having its opposite end portion supported to rest and move upon another suitable portion of the body-frame; a reciprocative member consisting of a bar C having universal-jointed connection with the arm which extends upwardly from the plow; means for operating the slide C and a cleat 11 extending over the free end portion of the I-beam; said I-beam being provided with a longitudinal slot through which the upright arm of the plow extends.

13. In a grading and ditching machine, a plow suspended for side tilt; a toggle device; and connection between the toggle device and plow for tilting the latter when the toggle device is operated.

14. In a grading and ditching machine, a plow suspended by chains or cables; a hand-wheel; an arm extending upwardly from the plow; power-transmitting connection between the hand-wheel and said arm for tilting the latter when the hand-wheel is operated.

15. In a grading and ditching machine, a plow suspended by chains or cables; a winding-shaft provided with a pilot-wheel; a latch-bolt normally engaging between spokes of the pilot-wheel; a treadle device arranged upon or adjacent to an attendant's platform of the machine; a spring normally maintaining the treadle in a raised position and holding the latch-bolt in engagement with the pilot-wheel; and power-transmitting lever connections between said treadle and the latch-bolt.

16. In a grading and ditching machine, a plow suspended by chains or cables; an arm attached to the plow; a reciprocative member for tilting the arm so as to tilt the plow laterally; said arm having a sliding and universally-jointed connection with the reciprocative member.

17. In a grading and ditching machine, a plow suspended by chains or cables; an arm rigidly secured to the plow and extending upwardly therefrom, and mechanism for tilting the arm and plow applied to the said arm.

18. In a grading and ditching machine, a plow having an upwardly-extending arm which is secured to the plow so as to tilt in unison therewith; and a laterally-swinging and longitudinally-movable member connected with the said arm by a universal swivel-joint.

LUKE VINCENT BROPHY.

Witnesses:
L. M. KANAREL,
EMANUEL WENTZ.